United States Patent [19]

Hironaka

[11] Patent Number: 4,714,447
[45] Date of Patent: Dec. 22, 1987

[54] POWER TRAIN OF MOWING MACHINE
[75] Inventor: Yoshiaki Hironaka, Yokohama, Japan
[73] Assignee: Kioritz Corporation, Tokyo, Japan
[21] Appl. No.: 850,445
[22] Filed: Apr. 8, 1986

Related U.S. Application Data

[63] Continuation of Ser. No. 701,237, Feb. 13, 1985, abandoned.

[30] Foreign Application Priority Data

Feb. 14, 1984 [JP] Japan .................... 59-19585[U]

[51] Int. Cl.$^4$ ................................ F16C 1/06
[52] U.S. Cl. ........................ 464/52; 30/276; 464/180
[58] Field of Search ............. 30/240, 276, 296 R; 56/12.6, 12.7; 464/51, 52, 53, 57, 58, 170, 178, 180

[56] References Cited

U.S. PATENT DOCUMENTS

| 204,645 | 6/1978 | Wilkerson | 464/52 |
| 2,586,360 | 2/1952 | Mall | 464/58 X |
| 2,759,341 | 8/1956 | Wiley | 464/57 |
| 4,226,021 | 10/1980 | Hoff | 464/52 X |
| 4,491,184 | 1/1985 | Kawaharazuka | 30/276 X |
| 4,505,040 | 3/1985 | Everts | 56/12.7 X |

FOREIGN PATENT DOCUMENTS 969571 9/1964 United Kingdom .................. 464/53

OTHER PUBLICATIONS

"Continuous Solid & Flexible Shaft Device", R. N. Smith, IBM Technical Disclosure Bulletin, vol. 24, No. 1B, Jun. 1981.

Primary Examiner—Daniel P. Stodola
Attorney, Agent, or Firm—Browdy and Neimark

[57] ABSTRACT

A power train of a mowing machine including a joint member of a substantially cylindrical configuration rotatably journalled by a bearing mounted to an inner surface of an operating rod through a vibration damping member, a flexible shaft connected at one end thereof to an output shaft of a prime mover and at an opposite end thereof to the joint member, and a rigid transmission shaft connected at one end thereof to the joint member and extending through the operating rod. The rigid transmission shaft is connected at an opposite end thereof to a cutter blade device connected to a forward end of the rigid transmission shaft.

1 Claim, 2 Drawing Figures

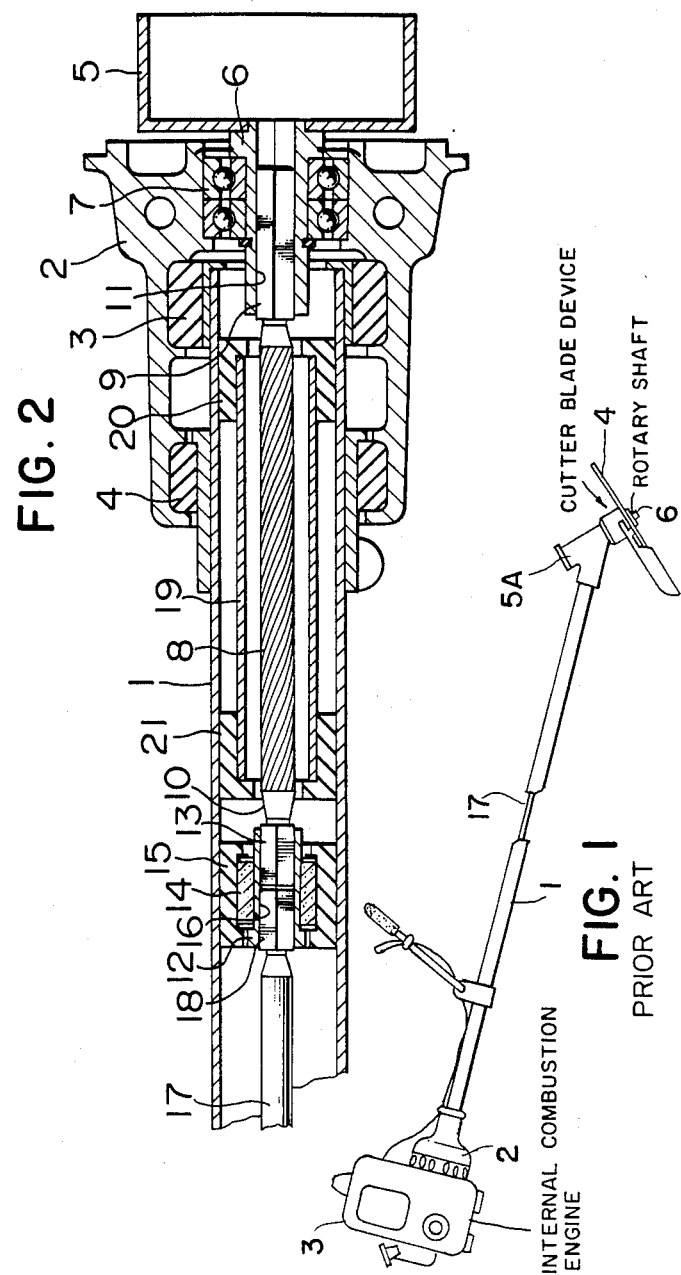

POWER TRAIN OF MOWING MACHINE

This application is a continuation of application Ser. No. 701,237, filed Feb. 13, 1985, now abandoned.

BACKGROUND OF THE INVENTION

This invention relates to a power train of mowing machine, and more particularly it is concerned with a power train arrangement in an operating rod for transmitting driving power from a prime mower, such as an internal combustion engine, connected to a rear end of the operating rod to a cutter blade device attached to a forward end of the operating rod.

Generally, a power train of a mowing machine in which the prime mover has a relatively high output power comprises a transmission shaft formed of a rigid material, such as steel, and having a relatively large length which extends through the operating rod and is connected at one end thereof to an output shaft of the prime mover and at an opposite end to a rotary shaft of the cutter blade device. In the mowing machine, the prime mover is secured through a rubber member or other vibration damping member to the rear end of the operating rod to minimize vibration which is transmitted from the prime mover to the operating rod during operation, to thereby provide protection to the operator who performs the operation by gripping the operating rod. In this type of mowing machine, torsional and transverse vibrations of a relatively high magnitude have tended to occur during operation due to the vibration of the prime mover and misalignment of the transmission shaft with the output shaft because of the large length of the transmission shaft. The torsional and transverse vibrations have raised the problem that they are transmitted to the operator through the operating rod, thereby interfering with the operation and reducing operation efficiency.

SUMMARY OF THE INVENTION

This invention has been developed for the purpose of obviating the aforesaid problem of the prior art. Accordingly, the invention has as its object the provision of a power train of a mowing machine which is simple in construction and low in vibration while having a high practical value.

The outstanding characteristics of the invention enabling the aforesaid object to be accomplished comprise a flexible shaft connected at one end thereof to an output shaft of a prime mover connected to a rear end of a hollow operating rod and extending axially through the operating rod, and a joint member of a substantially cylindrical configuration rotatably journalled by a bearing mounted to an inner surface of the operating rod through vibration damping members. The flexible shaft is connected at an opposite end thereof to the joint member, and a rigid transmission shaft is connected at one end thereof to the joint member and extends through the hollow operating rod and connected at an opposite end to a cutter blade device connected to a forward end of the operating rod.

By virtue of the constituent features of the invention described hereinabove, the torsional and transverse vibrations which might otherwise be caused to occur by the vibration of the prime mover and the misalignment of the transmission shaft with the output shaft can be absorbed by the flexible shaft constituting a portion of the transmission shaft which is near the prime mover, to thereby minimize the vibrations transmitted to the operating rod. The length of the flexible shaft is suitably decided by taking into consideration the natural frequency of the power train, so that the vibrations can be damped satisfactorily. The joint member connecting the flexible shaft and rigid transmission shaft at their inner ends has its construction simplified because it is made to function as a portion journalled by a bearing in addition to performing the essential function of connecting the two shafts together, and the bearing journalling the joint member is mounted through a vibration damping member, thereby enabling self-alignment of the shafts and damping of vibration of the shafts to be achieved.

BRIEF DESCRIPTION OF THE DRAWINGS

FIG. 1 is a vertical sectional view, with certain parts being broken away, of the essential portions of the mowing machine incorporating therein the power train comprising one embodiment of the invention.

FIG. 2 is a side view of a mowing machine incorporating the invention.

DESCRIPTION OF THE PREFERRED EMBODIMENT

A preferred embodiment of the invention will now be described by referring to the accompanying drawing.

An operating rod 1 of a hollow tubular configuration has an internal combustion engine holding member 2 of cylindrical configuration mounted to an outer periphery of a rear end portion or a right end portion thereof as viewed in the drawing through a pair of annular vibration damping members 3 and 4 formed of rubber. An internal combustion engine is secured to an axial outer end of the holding member 2. A clutch drum 5 receives the driving power of the engine. The holding member 2 is composed of two sections each constituting one-half of a cylinder cut axially through a center axis, to facilitate the assembling of the vibration damping members 3 and 4.

The clutch drum 5 has an output shaft 6 journalled for rotation by a bearing 7 mounted in the holding member 2 and extending into an internal space of the operating rod 1 substantially through a central portion thereof in an axial direction. A flexible shaft 8 formed of a flexible material, such as a steel wire, and having a suitable length and a diameter is connected at one end thereof to an inner end of the output shaft 6 and has square shaft portions or splines 9 and 10 each at one of opposite end portions thereof. One square shaft portion or spline 9 is fitted in an axially oriented square opening or groove formed in a central portion of the inner end of the output shaft 6. The other axially oriented square shaft portion or spline 10 is fitted in an axially oriented square opening or groove formed in a central portion of one end of a joint member 12 of cylindrical configuration. The joint member 12 is rotatably journalled at an outer periphery thereof by a bearing 14 which is mounted to an inner peripheral surface of the operating rod 1 through an annular vibration damping member 15 formed of rubber, and has an axially oriented square opening 16 formed in a central portion of an opposite end thereof. A square shaft portion 18 formed at one end of a rigid transmission shaft 17 is fitted in the square opening 16. The transmission shaft 17 is formed of a rigid material, such as steel, and extends through the internal space of the operating rod 1 as far as a forward end or a left end thereof, as viewed in FIG. 1, to be connected to a rotary shaft of a cutter blade device.

A sleeve member 19 is mounted in the internal space of the operating rod 1 around the flexible shaft 8 in spaced apart relation, and supported at opposite ends thereof by an inner surface of the operating rod 1 through a pair of annular vibration damping members 20 and 21 formed of rubber. The sleeve member 19 performs the function of preventing damage to the power train by suppressing excessive flexing of the flexible shaft 8 during operation.

What is claimed is:

1. A power train of a mowing machine comprising:

a relatively short flexible shaft connected at one end thereof to an output shaft of a prime mover connected to a rear end of a hollow straight operating rod, said flexible shaft extending axially through said operating rod;

a joint member of cylindrical configuration rotatably journalled by a bearing mounted to an inner surface of the operating rod near the rear end thereof through a vibration damping member, said joint member being connected to an opposite end of said flexible shaft;

a relatively long rigid transmission shaft connected at one end thereof to said joint member, said rigid transmission shaft extending through said operating rod and connected at an opposite end thereof to a cutter blade device connected to a forward end of the operating rod; and a sleeve member mounted to an inner surface of said operating rod through a vibration damping member, said sleeve member being located around said flexible shaft.

* * * * *